United States Patent [19]
Chen

[11] Patent Number: 5,299,438
[45] Date of Patent: Apr. 5, 1994

[54] AUTOMOBILE STEERING LOCK

[75] Inventor: Shih-Yu Chen, Tainan Hsien, Taiwan

[73] Assignee: All Ship Enterprise Co., Ltd., Tainan Hsien, Taiwan

[21] Appl. No.: 980,692

[22] Filed: Nov. 24, 1992

[51] Int. Cl.⁵ ............................................. B60R 25/02
[52] U.S. Cl. ...................................... 70/209; 70/226
[58] Field of Search ............... 70/209, 211, 212, 225, 70/226, 238, 237

[56] References Cited

U.S. PATENT DOCUMENTS

| | | | |
|---|---|---|---|
| 3,828,593 | 8/1974 | Bolton | 70/209 |
| 4,829,797 | 5/1989 | Wu | 70/209 |
| 4,882,920 | 11/1989 | Wu | 70/209 |
| 4,949,561 | 8/1990 | Solow et al. | 70/209 |
| 5,024,069 | 6/1991 | Hull, Jr. et al. | 70/209 |
| 5,052,201 | 10/1991 | Liou | 70/209 |
| 5,095,723 | 3/1992 | Lin | 70/209 |
| 5,119,651 | 6/1992 | Yang | 70/209 |
| 5,168,732 | 12/1992 | Chen et al. | 70/209 |
| 5,197,308 | 3/1993 | Pazik | 70/209 |
| 5,199,284 | 4/1993 | Lin | 70/209 |

Primary Examiner—Peter M. Cuomo
Assistant Examiner—Darnell M. Boucher
Attorney, Agent, or Firm—Morton J. Rosenberg; David I. Klein

[57] ABSTRACT

An anti-theft device for attachment to a steering wheel of an automotive vehicle having a movable tubular member fitting movably around an elongate rod member to adjust the distance in relation to the rod member so as to catch hold of a portion of a steering wheel with a double hook and a stop plate provided at one end of the rod member and a bent plate provided under the tubular member, and the tubular member being locked at an adjusted position by means of a lock including a steel ball engaging one of annular grooves provided on a portion of the rod member.

1 Claim, 3 Drawing Sheets

AUTOMOBILE STEERING LOCK

BACKGROUND OF THE INVENTION

1. Field of the Invention

This invention pertains to vehicle steering locks attachable to steering locks attachable to steering wheels to prevent unauthorized use of the vehicles.

2. Prior Art

Automobile steering locks are well known in the prior art. However, such prior art devices generally have extended lengths and are heavy which increases the difficulty in handling and is inconvenient for storing the devices when not in use.

SUMMARY OF THE INVENTION

The object of this invention is to offer steering wheel locks having the following features:

1. The extended length of this automobile steering lock is less than most steering locks known in the prior art;
2. The subject steering lock is convenient in use and storing; and,
3. The subject steering lock may be easily manipulated for mounting on a steering wheel without impacting instruments or windshields of an automotive vehicle.

DESCRIPTION OF THE PREFERRED EMBODIMENTS

Figure 1:
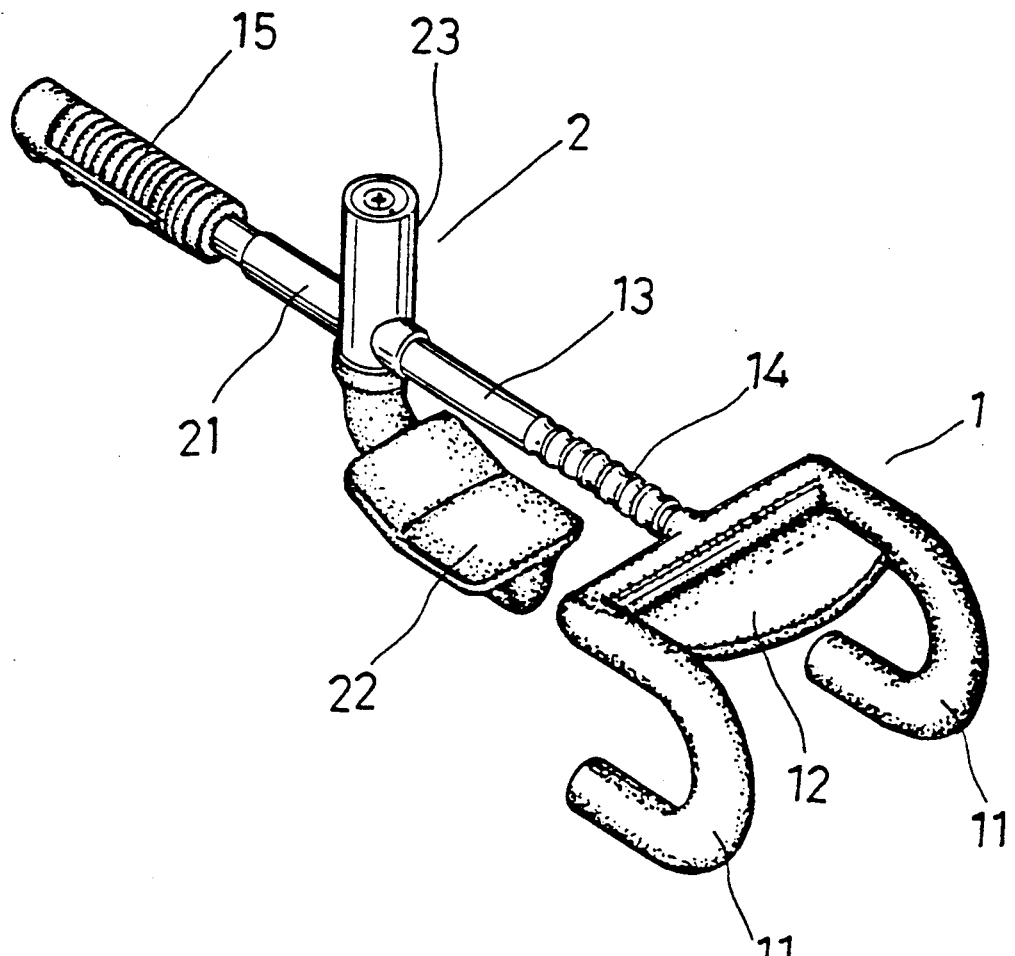
FIG. 1 is a perspective view of an automobile steering lock showing the present invention concept.

The automobile steering lock describing the present invention is shown in FIG. 1 and includes an elongate rod member 1, a movable or displaceable tubular member 2, and a lock assembly contained in a lock housing 23.

The elongate rod member 1 has a double hook 11 formed on one end to hook on a portion of a steering wheel of a car. A stop plate 12 is secured between two parallel portions or legs of the double hook 11. The legs of the double hook 11 have end portions as shown in the Figures which extend around a peripheral surface of the rim of the steering wheel 3. A plurality of annual grooves 14 are formed in a portion of the body 13 of the tubular member 2 near the double hook 11. A grip 15 is formed at one end of the tubular member 2.

The movable tubular member 2 has a tubular portion 21 slidably mounted on the body 13 of the elongate rod member 1. A bent or L-shaped plate 22 extends downward from the tubular member 2. A lock housing 23 formed upwardly in a vertical direction to the body 13 of the tubular member 12 contains a key actuated lock assembly.

Figure 2:
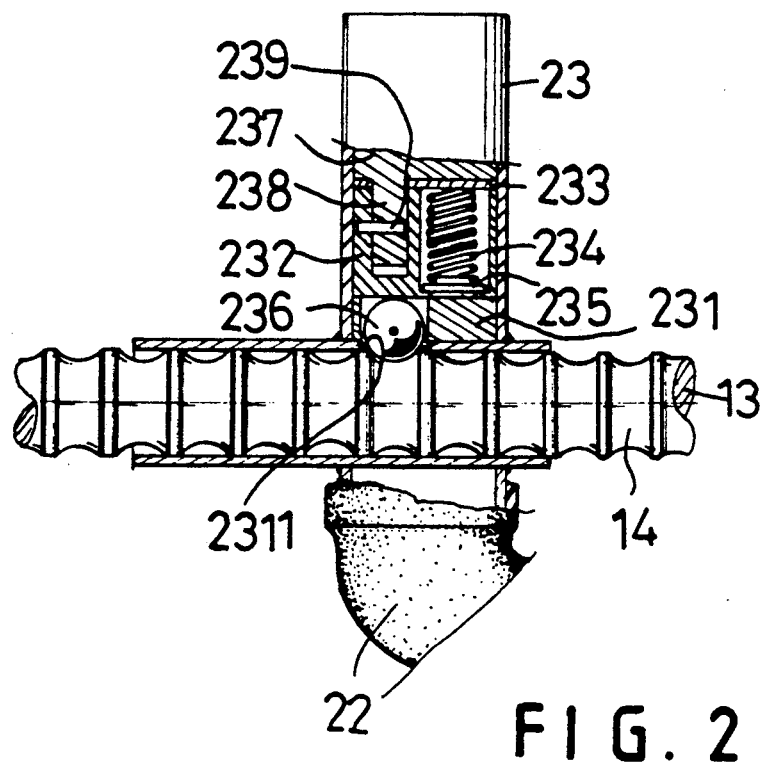
FIG. 2 is a cross-sectional view of the automobile steering lock in locked position in the present invention concept.
Figure 3:
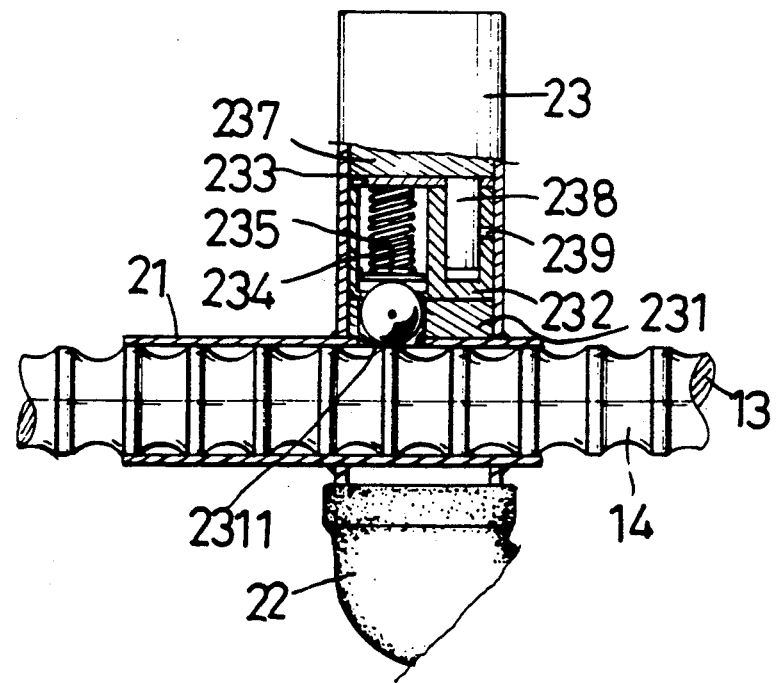
FIG. 3 is a cross-sectional view of the automobile steering lock in an unlocked position of the present invention concept; and, FIG. 4 is a perspective view of the automobile steering lock, locked on a steering wheel of an automotive vehicle in the present invention.
Figure 4:
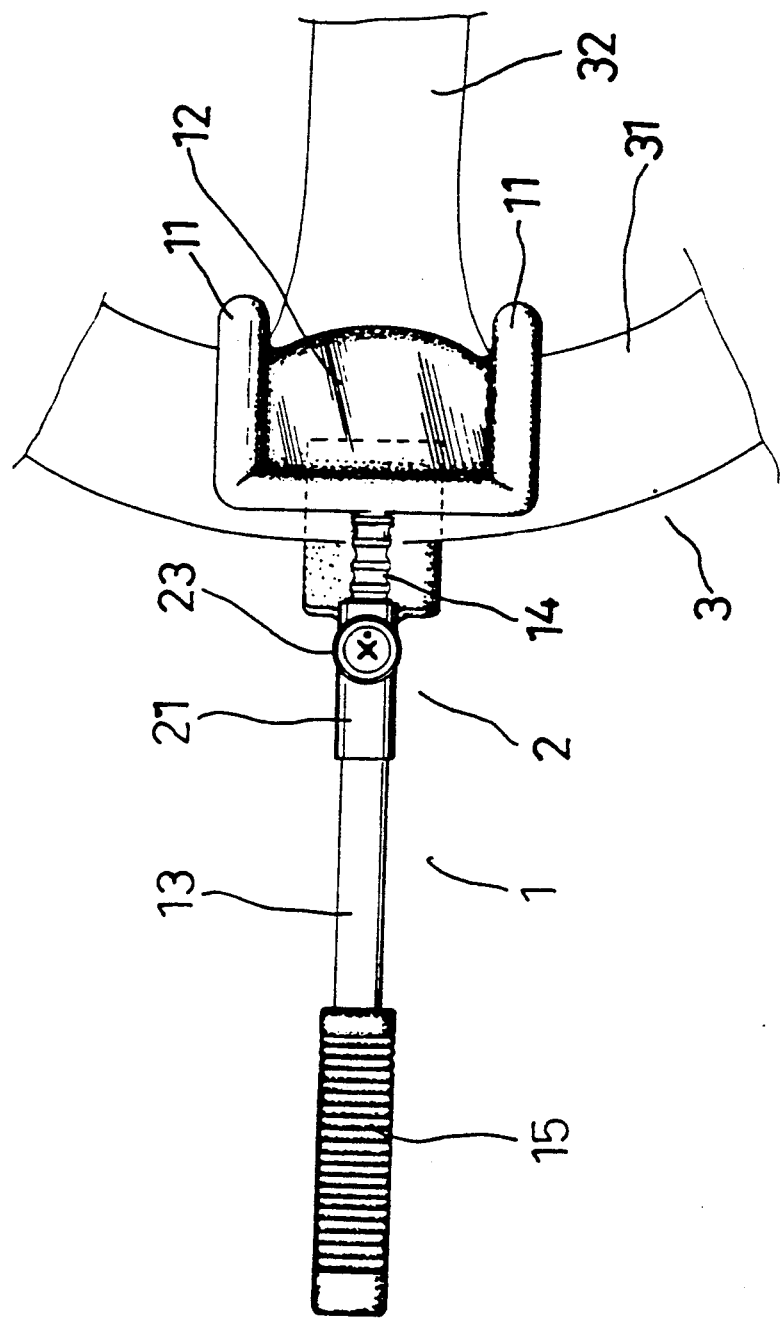

The lock housing 23 contains the lock assembly which consists of a ball base 231, a rotatable socket 232, a bottom plate 233, a spring 234, a movable plate 235, a steel ball 236 and a key block 237, as shown in FIGS. 2 and 3. The key block 237 provides for a key to be inserted therein to provide locking and unlocking actuation. The key block 237 is located on the bottom plate 233 having a structure much in the manner of a common conventional lock. There is further provided a rod 238 projecting downward and combined with the rotatable socket 232 having a pin 239. A ball 236 is biasedly positioned in the ball base 231 and is prevented from escape by a projection edge 2311. The spring 234 and the movable plate 235 are deposited in the rotatable socket 232 which elastically pushes the steel ball 236 to engage one of the annular grooves 14 of the elongate rod member 1.

When the lock is in the locked position, as shown in FIG. 2, the ball 236 is engaged with one of the annular grooves 14 of the rod member 1. The ball 236 presses on the bottom of the touching plate 235 in the rotatable socket 232 and the rod member 1 is maintained immovable by the ball 236.

If the rotatable socket 232 is rotatably actuated by a key to the position shown in FIG. 3, the lock is in the unlocked position with the ball 236, the spring 234 and the movable plate 235 being aligned with each other. The spring 235 enables the ball 236 to move up and down so that the movable tubular member 2 can be displaced on the annular grooves of the rod member 1.

When this automobile steering lock is to be mounted on a portion of a steering wheel 3 of an automotive vehicle to lock it in a stationary position, the double hook 11 is first placed around a curved portion 31 of the steering wheel 3 with the grip 15 extending outward and the stop plate 12 placed on rib 32 of the steering wheel 3. The movable tubular member 2 is then moved on the rod member 1 toward the double hook 11. This forces the bent plate to move under the curved portion 31 of the steering wheel 3. A key is then used for insert in the key block 237 to a locking mode keeping the movable tubular member 2 in the annular grooves 14 stationary and the elongate rod member 1 prevents the steering wheel from being rotated.

While the preferred embodiments of the invention have been described above, it will be recognized and understood that various modifications may be made therein and the appended claims are intended to cover all such modifications which may fall within the spirit and scope of the invention.

What is claimed is:

1. An automobile steering lock for attachment to an arcuately contoured steering wheel having radially extending rib members secured on one end to a rim portion of said steering wheel, comprising:
   (a) a longitudinally extending rod member having a plurality of annularly formed grooves formed within a peripheral surface and a grip member secured to a first end thereof;
   (b) a double hook member formed on a second end of said rod member, said double hook member defining in plan cross-section a U-shaped contour having a hook base member secured to a pair of transversely displaced hook leg members, each of said hook leg members having an arcuately contoured end section for contiguous positional placement partially surrounding an outer surface of said rim portion of said steering wheel;
   (c) a stop plate member attached to a portion of said hook base member and said hook leg members for contiguous interface with an upper surface of said rim portion of said steering wheel whereby said fixedly secured stop plate member extends substantially co-planar with said hook base member and an adjacent section of said hook leg members for releasably capturing said rim portion between said stop plate member and said hook leg members end sections;

(d) a displaceable tubular member slidably mounted on said longitudinally extending rod member, said displaceable tubular member having an L-shaped plate member secured to a lower surface of said displaceable tubular member for contiguous interface with a lower surface of said rim portion of said steering wheel, a portion of said rim being captured between said stop plate member, said L-shaped member, and said end sections of said hook leg members; and, (e) a lock housing formed on said displaceable tubular member for insert therein of a key actuated lock, said lock being actuated for lockingly engaging said displaceable tubular member at a predetermined location on said longitudinally extending rod member for lockingly engaging said steering lock to said steering wheel.

* * * * *